June 19, 1928.
F. C. ATWOOD
1,673,964
METHOD OF PRODUCING PROTEIN PRODUCTS
Filed Dec. 5, 1922 3 Sheets-Sheet 1
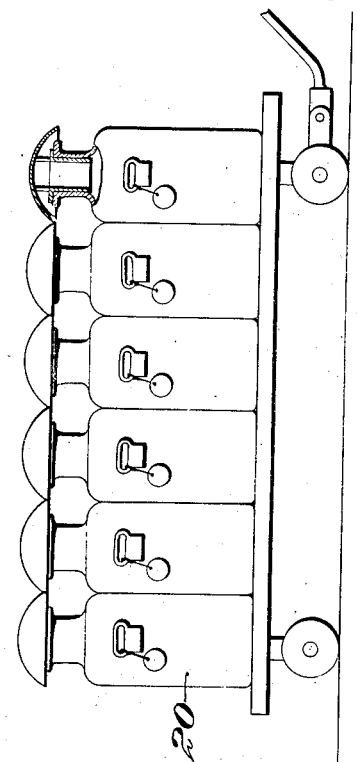
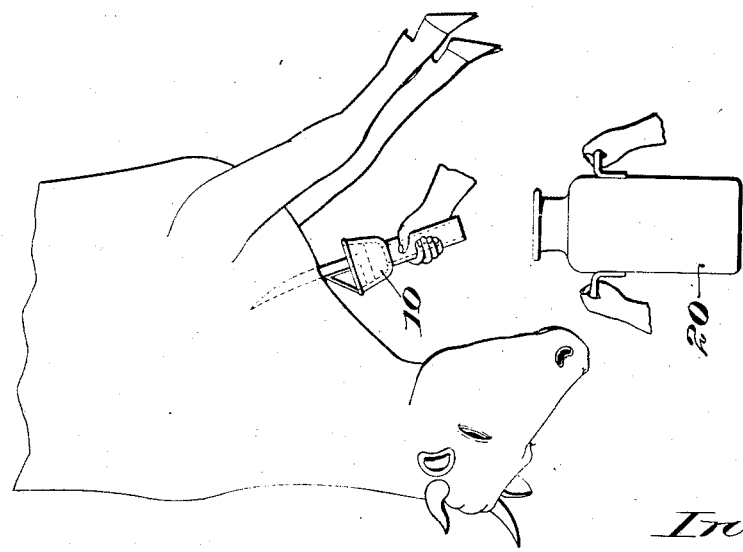
Inventor
Francis Clarke Atwood
by his attorneys
Van Buren Fish Hildreth & Cary
Witness
Jas. J. Maloney

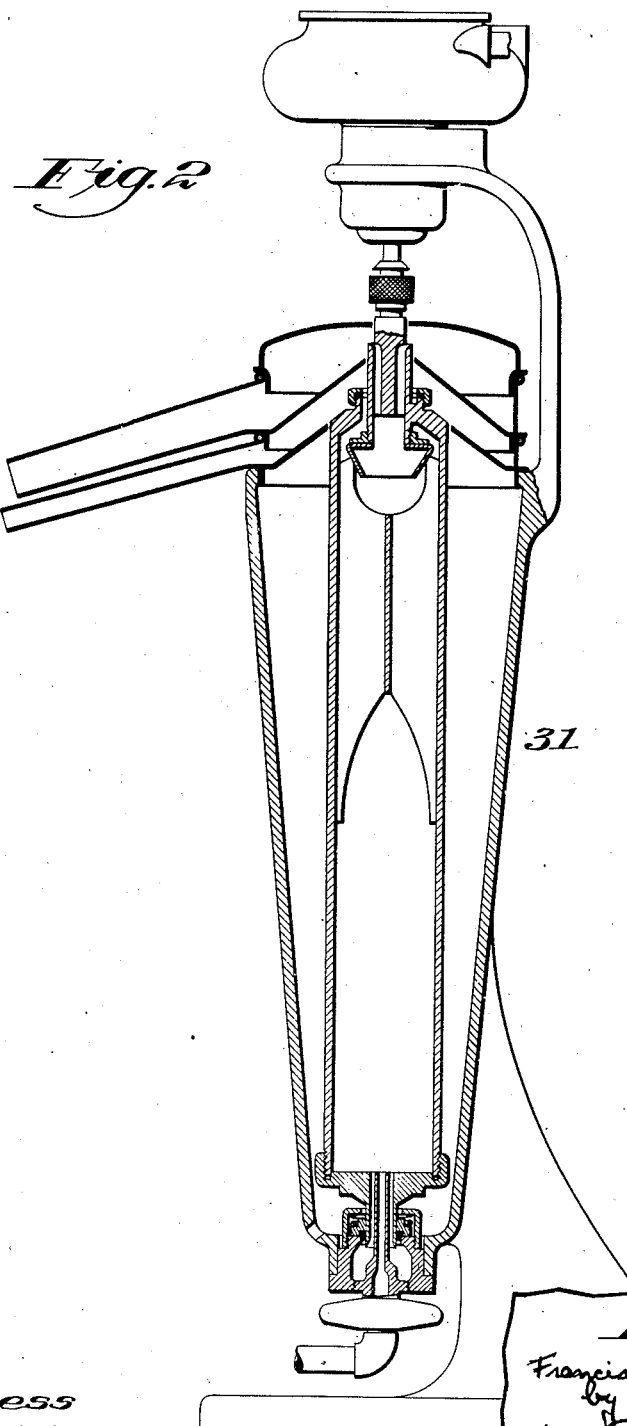

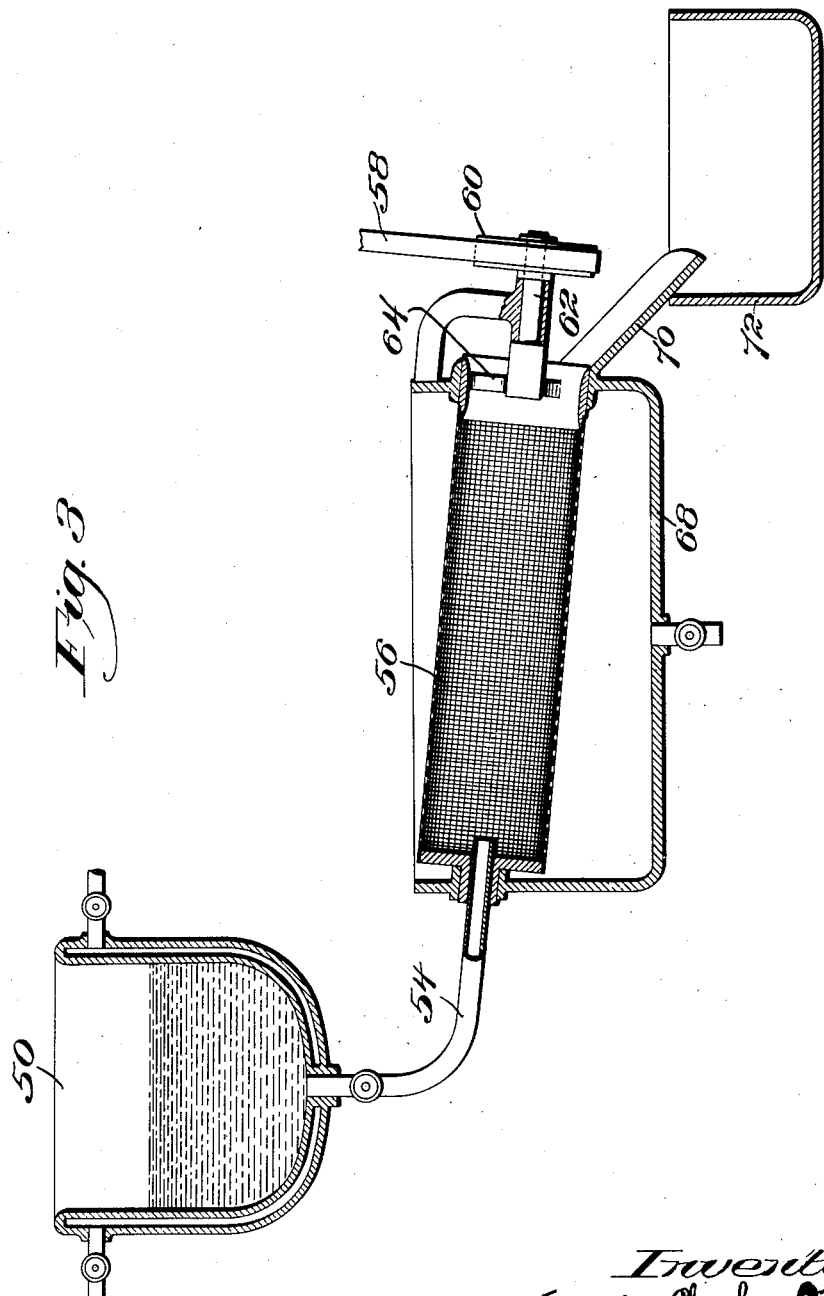

Patented June 19, 1928.

1,673,964

UNITED STATES PATENT OFFICE.

FRANCIS CLARKE ATWOOD, OF NEWTON, MASSACHUSETTS, ASSIGNOR TO AMERICAN PROTEIN CORPORATION, OF BOSTON, MASSACHUSETTS, A CORPORATION OF MASSACHUSETTS.

METHOD OF PRODUCING PROTEIN PRODUCTS.

Application filed December 5, 1922. Serial No. 605,092.

This invention relates to certain novel protein products and also to methods of and apparatus for their production.

The primary object of the invention is to produce from the blood of food animals, particularly beef, protein products of such form and general characteristics as to enable them to be used as foods and food bases.

With this general object in view the invention consists in the products, methods and apparatus hereinafter described and particularly defined in the claims.

In the drawing, Fig. 1 represents diagrammatically the method by which the blood is preferably obtained from the animals upon the killing floor of a slaughterhouse. Fig. 2 is a sectional view of apparatus for separating the red corpuscular matter from the blood, and Fig. 3 is a layout of a section of the apparatus preferably used for producing certain of the protein products, as will be described.

The valuable and nutritious properties of the proteins occurring as constituents of the blood of food animals have been recognized for some time by those who have searched for new foods. Prior to the invention of W. B. Wescott disclosed in an application filed by him on even date herewith no successful process has, as far as I am aware, been proposed for the recovery of these valuable proteins in such form that they might be commercially used for edible purposes. In the Wescott application a process is disclosed for the production, from the blood of a number of food animals, of protein products having unusual stability, purity, sterility and uniformity of composition and, furthermore, entirely free from the objectionable red color of the blood. These products are produced in accordance with Government inspection and are meeting with considerable favor as foods and food bases. The products of the Wescott process comprise first a dilute liquid product, straw yellow in color, and having no suggestion of the objectionable red color of blood. This product has a gravity of approximately 4½° Bé. and contains about 9% solids. The bacterial content of this product is relatively low and its sterility, being lower than bulk fluid or frozen egg white of the American market, is comparable to high grade milk. The product contains a mixture of the essential plasma proteins of the blood of a plurality of food animals and finds use as a food or food base to be used in baking and cookery much in the same manner that ordinary egg albumen is used. A second product of the Wescott process comprises a dilute straw colored liquid produced from the first product by defibrination in known ways as, for example, by recalcifying, agitation and removal of fibrin. This product approximates but is clearly distinguished from the so-called inedible blood albumen of the prior art in respect to its color, purity, stability and general properties by which it is rendered fit for use as a food. This dilute product containing a mixture of the essential serum proteins of blood of a plurality of food animals may in accordance with the Westcott process be obtained in the form of a solid containing all the foregoing desirable characteristics, and in addition being extremely soluble.

Referring to the Wescott application and to which reference is made by permission, the dilute straw colored product containing the mixture of the essential plasma proteins of the blood of a number of food animals is produced by a process including the recovery of the blood from a number of food animals during their slaughter upon the killing floor of a slaughterhouse in such manner as to meet with Government inspection and to enable the blood thus recovered to be thereafter successfully treated for the separation of all, or substantially all, of the red corpuscular matter to produce the desired straw yellow product above referred to. In practising the Wescott process the butchering operation is preferably accomplished by the use of a knife of improved design and construction and which forms the subject matter of another co-pending application filed by me on even date herewith. This improved knife 10 comprises a hollow handle having a cup at one end thereof of sufficient size to cover the wound, and a blade supported from the cup end of the knife extends beyond the handle. The blade and handle are substantially of a size and general weight of the ordinary butchering knives so that the instrument may be wielded in exactly the same manner that the ordinary butchering knife is employed. After the animal has been moved to butchering position an incision is made exactly at the point where an incision is made in accordance with the present slaughtering practice and the blood permitted to flow through the hollow handle of the butchering knife into a prepared container 20, as is fully described in such Atwood application and diagrammatically illustrated in Fig. 1 of the drawing. After recovery of the blood, coagulation thereof is retarded sufficiently to allow further treatment of the blood for the separation of all the red coloring and corpuscular matter therefrom. This is accomplished by the use of an edible anti-coagulant, such as a solution of sodium citrate or other salts. The separation of all of the red corpuscular matter from the blood thus recovered is accomplished by passing the blood through a continuous centrifuge 31 of the construction illustrated in Fig. 2 of the drawings and within which the entering blood stream initially impinges upon a slowly rotating body of blood during the operation of the centrifuge and is accelerated by contact with such liquid surface, thereby avoiding all rupture of the red corpuscles. Provision is also made for preventing contact of the blood during the period when it is being brought up to speed with obstructions of any kind within the centrifuge. In addition provision is made for preventing the passage of air currents through the centrifuge during its operation to prevent colorations of the straw colored product from this cause.

While in the process disclosed in the Wescott application the lighter effluent is at the start of the centrifuge colored, I have also discovered that the usual red coloration in the effluent accompanying the starting of the centrifuge was due primarily to the smashing of the red blood corpuscles of the initial portions of the blood stream as it is suddenly brought into contact with the rapidly rotating bowl itself. In practice, considerable blood must be passed through the centrifuge according to the Wescott method, before the effluent becomes devoid of color, so that a certain amount of blood is lost or wasted during the starting of the centrifuge. In order to avoid such loss, provision is made for cushioning the entering blood stream from the rotating parts of the bowl to thereby permit it to be more gradually brought up to speed and to avoid the premature rupture of the red blood corpuscles. This cushioning effect may be advantageously produced by wetting the interior walls of the bowl with a similar liquid. For this purpose, I have found that a common salt solution having a salt concentration at least as great as the salt concentration in normal blood, namely isotonic concentration, effectively serves this purpose. If desired, other solutions or liquids having no hemolyzing effect upon the blood can be used, as, for example, some of the colorless effluent obtained during a previous run of the centrifuge. In practice, however, I prefer to utilize a common salt solution of approximately 2% of concentration which is introduced before the blood stream into the bowl. Thereafter the blood is introduced in the usual manner and the operation of separating the red corpuscular matter proceeds. The initial discharge from the centrifuge comprises the salt solution which is collected separately and thereafter a light yellow effluent and the red corpuscular matter emerge from the discharge nozzles and are collected separately.

While the dilute straw colored product of the Wescott process containing the plasma protein or the defibrinated product in either liquid or dry form may be used as such with advantage in baking or cooking I have discovered that such products may be further treated to convert them into other products having additional desirable characteristics which enable them to be used with more advantage for commercial cooking and baking purposes. The dilute straw colored product of the Wescott process contains in solution the proteins, fibrinogen, serum globulin and serum albumen. The solution also contains anti-coagulants in the form of either sodium citrate or other salts by which the tendency of the protein fibrinogen to change from a liquid to a jelly-like solid is retarded. The second Wescott product containing the serum proteins, serum globulin and serum albumen, and which is produced by defibrination of the dilute plasma product, contains a substance "thrombin" which acts as a fibrin ferment—that is, upon contact of such a solution containing this fibrin ferment with another solution containing the protein fibrinogen the conversion of the fibrinogen to fibrin takes place rapidly in a neutral or acid solution.

In order to render the Wescott products more suitable for baking and cooking purposes to produce cooked products of a high quality, lightness and of the spring or resiliency of similar products made by the use of egg white of high quality, I have discovered that the form and proportion in which the fibrinous material is present in the particular product is of importance in imparting the desired characteristics to the ultimate cooked product. If, from the dilute Wescott product containing the plasma proteins, a portion of the fibrinogen or fibrin forming material is removed, the remaining product possesses better qualities from a baking point of view. The presence of excessive amounts of the fibrin in such products renders them too stiff and tough for the best use. I have found that such a product containing a less proportion of fibrinogen or of fibrinous material, may be conveniently formed by completely removing the fibrinogen from the Wescott product, and thereafter adding additional material containing fibrinogen or fibrinous material in the desired proportion. I have discovered that if the Wescott product containing the plasma proteins be held at a temperature of 56° C. or 130° F. the differential separation of the protein fibrinogen product may be successfully accomplished. When such a solution is held at this temperature the fibrinogen product is coagulated in a form vastly different physically from normal clotted fibrin and being in a spongy mass similar in nature to a coddled egg. Considerable care, however, must be taken to prevent this solution from being overheated because if held even at as low a temperature as 58-60° C. for any time greater than a few minutes, the proteins, serum globulin and serum albumen are easily denatured. Under such conditions a gradual change in composition takes place and imparts a creamy color or opalescence to the resulting solution. Because, however, of the nature of the heat coagulated fibrinogen product, the separation of it from the solution of the other proteins is a matter of considerable difficulty. In practice I have found that the apparatus illustrated in Fig. 3 may be used to effect this separation in a practical and commercial manner. Referring to Fig. 3, the dilute straw colored product as it comes from the centrifuge of the Wescott process is heated within the steam jacketed vat 50 up to a temperature of 56° C. This temperature is maintained for a short period of time sufficient to cause the coagulation of all of the fibrinogen in the solution. When coagulation is complete the solution containing the coagulated mass is withdrawn through the conduit 54 from the vat 50 and delivered into the interior of a rotary screen 56 at its upper end. The screen 56 is rotated slowly by a belt 58 driven by a source of power, not shown, the belt running over a pulley 60 on the outer end of the shaft 62 secured by a spider 64 to the lower end of the screen. The screen is journaled at both ends in suitable bearings within a receptacle 68 and is arranged at a sufficient angle or inclination so that during the filtering operation the coagulated mass of fibrinogen gradually rolls from the upper to the lower end of the screen and operates to automatically pick up all of the coagulated material from the different parts of the screen, thereby keeping the screen clean and in a condition conducive to the most efficient filtration. The action of the material in this respect is very similar to the action of a snow ball which when rolled over a layer of snow operates to pick up succeeding quantities of snow and to grow larger and larger in diameter. When the coagulated mass reaches the lower end of the screen it passes out through the lower end thereof and passes over the trough 70 into a receptacle 72. The filtrate, comprising a solution of the proteins, serum globulin and serum albumen, may be withdrawn from the tank and treated further, as will be described. While the screen is herein utilized for the separation of a gelatinous mass of coagulated fibrinogen, it may be used with advantage for the separation of other materials such as fats, gelatines, glue and similar difficultly filterable materials.

The filtrate from the foregoing operation because of its manner of production contains no fibrin ferments or agents such as to induce clotting when mixed with another solution containing fibrinogen. This characteristic of the solution is, as has been pointed out, of advantage in the production of products approximating the characteristics of egg white and of whole egg. This dilute filtrate may be successfully concentrated by low temperature evaporation until its gravity approximates 16° Bé. and it contains about 35% solids. Furthermore, under proper conditions this concentrated liquid may be dried without producing insolubility, denaturing the proteins, or otherwise rendering them unsuitable for edible purposes. In a similar manner the dilute product of the Wescott process containing the plasma proteins may be concentrated and dried. In both their concentrated liquid form and in their dried form all of the foregoing products possess high keeping qualities, and in fact samples have been made which have kept nicely for a period of a year and one-half without any decomposition whatsoever.

For some purposes it is highly desirable to prepare products which shall be a fairly accurate equivalent of egg albumen. For this purpose the primary requisite is that the product shall have good beating or whipping quality so that when beaten an emulsion of it with air is formed which has many times the volume of the original material, and it is further desirable that this emulsion shall be stable and stiff and capable of not breaking down for some period of time. It is known that the white of an egg is an alkiline, transparent, albuminous fluid enclosed in a framework of thin membrane or fibre. This membrane or fibrous portion is also transparent, but it is insoluble in water or acid. In studying the properties of egg albumen I have found that if acid be added to the egg albumen, this membrane or fibre is immediately coagulated and thrown out of the solution as a white, opaque, tough fibre. In beating the white of an egg the fibre is usually rendered insoluble and the stiffness of froth produced by beating is dependent in part upon the volume of small insoluble tendrils or meshes of this fibre which aid in supporting the bubbles of the emulsion or froth. I have found that a protein solution containing a definite proportion of the fibrinogen or fibrinous material in a partially coagulated condition possesses characteristics including tenacity and froth producing qualities which approach more nearly the physical characteristics of a high quality of egg white. The fact that the fibrinogen is in a partially coagulated condition appears to enable it to come out of the solution more readily upon whipping of the solution, with the result that the froth produced is more stable.

All of the foregoing products are neutral or slightly acid in nature, and I have further discovered that the character of the fibrinous material may be further improved by the use of a small amount of alkili. If fibrin is made alkaline to a degree approximating a 0.02 normal alkaline solution, it swells to many times its original volume becoming jelly-like and transparent and approaching very closely the white of an egg in physical appearance. I therefore utilize this peculiar property of fibrin to produce solutions of the composition and physical properties of egg white. If the product free from fibrinogen and made as above described by heat coagulation, and containing the proteins serum globulin and serum albumen be mixed in the proportion of 8 to 1, with the dilute plasma product of the Wescott process containing in addition the protein fibrinogen, and the solution made alkaline to about 0.02 normal, then if the fibrin is permitted to clot, then the fibrin as it forms assumes a membranous colloidal condition, imparting to the mass the physical appearance of the white of an egg. This material when beaten produces a froth of the general stiffness and tenderness of high quality egg white. The distinction between these products in a neutral or acid condition and in an alkaline condition is very marked. The former are more like gelatine, whereas the latter are membranous and fluid, closely resembling true egg white. The proportion of fibrinous material is important in controlling the stiffness of the froth and ultimate quality of the cooked product and the alkalinity of the fibrinous material imparts the desired physical appearance to the product. If desired, the treatment of the fibrinous material with alkali may be effected in different ways, and furthermore, materials may be produced by the incorporation of definite proportions of fibrinous material in other protein solutions, depending on the use of the product. The use of alkali in connection with the formation of the fibrin in these products enables one to use liquids containing the fibrin ferments, as ingredients in the final product for the reason that the alkali maintains the fibrin as it forms in an extended membranous condition, very different physically and from a baking point of view, from the ordinary tough fibrin usually formed by the action of such fibrin ferments. These products may be dried if desired and utilized by the baker in water solutions of such concentration as is found to be most expedient.

For some purposes it is desirable that products be produced having approximately the constitution and effect, from a baking point of view, of a whole egg. I have discovered that a blend of egg yolk with any of the foregoing products containing the three proteins, fibrinogen, serum globulin and serum albumen has the effect in making of a whole egg. This blending may be accomplished by the use of the protein products in either liquid or dried form. I prefer, however, to blend about two parts of dried egg yolk with one part of dried protein product. I have also found that it is possible to approximate whole egg in another way, by blending milk with these protein products. The milk acts as an emulsifying agent between the protein and the fats usually found in baking and in this manner acts very much as egg yolk does. I prefer to blend 3 pounds of dried protein product with 1 pound of dried skimmed or whole milk, but the blend may be made in different proportions and in liquid form.

As previously pointed out, all the foregoing protein products, including those produced by the Wescott process, have a high degree of stability and will keep without decomposition, even in their dilute form, for relatively long periods of time as compared with the relatively unstable, inedible blood albumen upon the market. I have discovered that the stability of these protein products may be further increased by eliminating from them the small amount of blood sugar which they normally contain. The fermentation of this blood sugar, when dilute solutions of these products are kept for long periods of time, produces a gas which is to some degree undesirable for edible purposes. I have found that if solutions of these products be maintained at a temperature of about 100° F. for a number of hours that the fermentation of the blood sugar will be complete. The addition of a small amount of yeast to such solution facilitates the fermentation and may be utilized with advantage to hasten it. The elimination of the blood sugar may be carried on if desired as a step in the complete process for the production of these products. This step may be conveniently accomplished in connection with the heat coagulation of the protein fibrinogen in the manner set forth above, and for this purpose the effluent from the centrifuge, comprising a solution of the plasma proteins of the blood of a number of the animals, is first held within the heating vat at a temperature of about 100° F. and a small amount of yeast added thereto, until fermentation of the blood sugar is complete. For separating the protein fibrinogen the temperature of the solution is then raised to 130° F. in order to permit this protein to coagulate in the manner above described. In this way the elimination of the blood sugar may be effected in a convenient and economical manner and the stability of the various protein products derived from the solution thus treated is accordingly increased.

In the dry form these protein products may be kept indefinitely without decomposition, and while they all possess a very high degree of solubility. The degree of solubility is determined in a large measure by the degree of acidity of the product and in order, therefore, to insure the maximum amount of solubility it is desirable that these products should contain small amounts of edible acids. The acid may be incorporated at any desired point in their production. Furthermore, the presence of a small amount of acid appears to have the effect of bleaching to some degree the straw color of the normal protein solutions.

The red corpuscular matter in the form of a thick syrupy mass resulting from the centrifugal separation above described is itself free or substantially free from the plasma proteins, and, inasmuch as it contains no fibrinogen, possesses no clotting power. This product containing primarily the protein hemoglobin may be dried and in dry form will keep indefinitely. It finds use as a food base for tonics, etc., as well as for those industrial purposes for which impure, unstable blood has heretofore been used.

The present products are to be distinguished from commercial blood albumen, so-called, particularly in that they are suitable for edible uses, having been derived from the blood of animals at the time of their slaughter for commercial food purposes, and these products are unusually free from contamination, from objectionable color and from other defects which have previously made protein products derived from animal blood unsuitable for food purposes. Even, for industrial uses they are distinguished by their solubility, lack of color, stability and cleanliness. Because of their high nutritious value the present products, in addition to their increased utility for industrial purposes, may be used with advantage in soups, drinks, salad dressings and all sorts of prepared foods and, in addition, as ingredients of foods prepared in ordinary cookery. The products containing fibrinous material may be used with advantage to produce equal or superior results to those produced by egg albumen. In addition, in their concentrated or dried form these products may be kept for long periods of time without any decomposition whatsoever.

While the different features of the invention have been described in their preferred forms, it is to be understood that certain features of the invention viewed in their broader aspects may be used in other forms within the scope of the following claims.

Having thus described the invention, what is claimed is:

1. In a process for producing an edible protein product the steps which consist in separating all of the red corpuscular matter from a quatity of animal blood and subjecting the resulting solution to heat to completely ferment the blood sugar contained therein.

2. In a process for producing an edible protein product the steps which consist in separating all of the red corpuscular matter from a quantity of animal blood and maintaining the resulting solution at approximately a temperature of 100° F. until fermentation of the blood sugar is completed.

3. In a process of producing an edible protein product the steps which consist in separating all of the red corpuscular matter from a quantity of animal blood, maintaining the resulting solution at fermentation temperature until fermentation of the blood sugar is completed, and thereafter raising the temperature of the solution to coagulate the fibrinogen.

4. The method of making a protein product having the characteristics of egg white, which consists in adding to a protein solution such a quantity of fibrinous material as to form a froth when the solution is whipped, having the tenderness and stability of whipped egg white.

5. The method of making a protein product having the characteristics of egg white, which consists in adding to a yellow solution containing the serum proteins of animal blood such a quantity of fibrinous material as to form a froth when the solution is whipped, having the tenderness and stability of whipped egg white.

6. The method of making a protein product having the characteristics of egg white, which consists in adding to a solution containing a protein of animal blood and fibrin forming elements sufficient alkali to gelatinize the fibrin when formed and thereby impart to the solution the property of forming a froth having the tenderness and stability of whipped egg white.

7. The method of making a protein product having the characteristics of egg white, which consists in treating fibrin with sufficient alkali to swell and gelatinize it, suspending a sufficient quantity of such fibrin in a protein solution to impart to the solution the property of forming a froth having the tenderness and stability of whipped egg white.

8. In a process for the separation of the red corpuscular matter from animal blood the steps for starting the continuous centrifugal separation of the animal blood to prevent rupture of the red corpuscles in the initial portions of the blood introduced into the centrifuge which consists in introducing first a salt solution into the centrifuge and thereafter immediately introducing the blood into the centrifuge so that the initial portions of the blood are brought up to speed by and in contact with the salt solution, the concentration of which is such as to prevent hemolysis.

9. In a process for producing a protein product from the blood of a number of food animals, the steps which consist in heating a solution containing the essential plasma proteins of the blood of a number of food animals to coagulate the protein fibrinogen, and thereafter separating the fibrinogen therefrom to produce a solution of the essential serum proteins of such animal blood.

10. In a process for producing a protein product from animal blood, the steps which consist in subjecting a solution containing the essential plasma proteins of the blood of a plurality of food animals to sufficient heat to partially coagulate the protein fibrinogen contained therein and thereafter separating the coagulated mass to produce a solution containing the essential plasma proteins of such animal blood but in which the proportion of fibrinogen is less than that occurring in normal animal blood.

11. In a process for producing a protein product from animal blood the steps which consist in completely separating the red corpuscular matter from the animal blood, treating the solution thus obtained to separate the fibrinogen therefrom without the production of fibrin ferments in the resulting solution.

12. The method of producing an edible protein product which consists in recovering the blood from a plurality of food animals during their slaughter, separating the red corpuscular matter therefrom, and heating the resultant liquid to coagulate the fibrinogen.

13. The method of producing an edible protein product which consists in recovering the blood from a plurality of food animals during their slaughter, separating the red corpuscular matter therefrom, and partially coagulating the fibrinogen contained in the resulant liquid and rendering it alkaline.

14. The method of producing an edible protein product which consists in recovering the blood from a plurality of food animals during their slaughter, separating the red corpuscular matter therefrom, and subjecting the resultant liquid to treatment to produce a proportion of alkaline fibrin therein less than the proportion of fibrinogen in normal animal blood.

15. In a process for the separation of the red corpuscular matter from animal blood, the art of starting the continuous centrifugal separation of the animal blood to prevent rupture of the red corpuscles in the initial portions of the blood introduced into the centrifuge, which consists in introducing first a liquid incapable of freeing hemoglobin into the centrifuge and thereafter immediately introducing the blood into the centrifuge so that the initial portions of the blood are brought up to speed by and in contact with the before mentioned liquid.

16. The method of separating a gelatinous material from a solution thereof which consists in heating the liquid to coagulate the gelatinous material, and delivering the liquid and material to a filter, and causing the material to move relatively to the filter to keep the filter clean.

17. The commercial method of producing a protein product comprising gathering the blood from a plurality of food animals during the commercial slaughtering routine in such a manner as to prevent the formation of free hemoglobin, separating substantially all of the red corpuscular matter from the clear liquid portion, separating the fibrinogen therefrom, and thereafter concentrating the liquid.

18. The commercial method of producing a protein product comprising gathering the blood from a plurality of food animals during the commercial slaughtering routine in such a manner as to prevent the formation of free hemoglobin, separating substantially all of the red corpuscular matter from the clear liquid portion, and separating the fibrinogen product therefrom by heat and coagulation.

19. The commercial method of producing a protein product comprising gathering the blood from a plurality of food animals during the commercial slaughtering routine in such a manner as to prevent the formation of free hemoglobin, separating substantially all of the red corpuscular matter from the clear liquid portion, separating the fibrinogen product therefrom by heat and coagulation, and thereafter concentrating the liquid.

20. The commercial method of producing a protein product comprising gathering the blood from a plurality of food animals during the commercial slaughtering routine in such a manner as to prevent the formation of free hemoglobin, separating substantially all of the red corpuscular matter from the clear liquid portion, separating the fibrinogen product therefrom by heat and coagulation, and thereafter drying the liquid.

FRANCIS CLARKE ATWOOD.